(12) United States Patent
Schmitt

(10) Patent No.: US 10,159,123 B2
(45) Date of Patent: Dec. 18, 2018

(54) CIRCUIT ARRANGEMENT AND METHOD FOR OPERATING SEMICONDUCTOR LIGHT SOURCES

(71) Applicant: OSRAM GmbH, Munich (DE)

(72) Inventor: Harald Schmitt, Munich (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/128,444

(22) PCT Filed: Mar. 2, 2015

(86) PCT No.: PCT/EP2015/054280
§ 371 (c)(1),
(2) Date: Sep. 23, 2016

(87) PCT Pub. No.: WO2015/144394
PCT Pub. Date: Oct. 1, 2015

(65) Prior Publication Data
US 2017/0111965 A1   Apr. 20, 2017

(30) Foreign Application Priority Data

Mar. 24, 2014 (DE) .................. 10 2014 205 469
Sep. 15, 2014 (DE) .................. 10 2014 218 422

(51) Int. Cl.
*H05B 33/08* (2006.01)

(52) U.S. Cl.
CPC ....... *H05B 33/0812* (2013.01); *H05B 33/089* (2013.01); *H05B 33/0815* (2013.01); *H05B 33/0842* (2013.01)

(58) Field of Classification Search
CPC ............ H05B 33/0812; H05B 33/0842; H05B 33/089
See application file for complete search history.

(56) References Cited

U.S. PATENT DOCUMENTS 3,678,368 A * 7/1972 Popp ............... H02H 7/1213
                                                    363/17
6,577,512 B2 * 6/2003 Tripathi ........... H05B 33/0815
                                                    363/21.15
(Continued)

FOREIGN PATENT DOCUMENTS

CN       102695332 A       9/2012
CN       103648204 A       3/2014
(Continued)

OTHER PUBLICATIONS

German Search Report based on application No. 10 2014 205 469.9 (8 pages) dated Nov. 28, 2014.
(Continued)

*Primary Examiner* — Alexander H Taningco
*Assistant Examiner* — Kurtis R Bahr
(74) *Attorney, Agent, or Firm* — Viering Jentschura & Partner MBB

(57) ABSTRACT

Various embodiment may relate to a circuit arrangement for operating a load, including an input for inputting a mains input AC voltage, a power converter circuit, a converter circuit which converts the mains input AC voltage rectified by the power converter circuit into an output voltage, a control circuit for controlling the converter circuit, and a linear regulating circuit which sets a predetermined load current at the load. The load current is a direct current with a uniform current intensity. The control circuit controls the converter circuit in such a manner that the current intensity of the load current is reduced when the output voltage is at a minimum.

15 Claims, 7 Drawing Sheets

(56) References Cited

U.S. PATENT DOCUMENTS

| | | | |
|---|---|---|---|
| 8,390,214 B2 * | 3/2013 | Van Laanen | H02M 1/4225 |
| | | | 315/294 |
| 8,575,863 B2 * | 11/2013 | Cai | H05B 33/0815 |
| | | | 315/185 S |
| 8,704,503 B2 * | 4/2014 | Williams | H02M 1/32 |
| | | | 323/222 |
| 2005/0218828 A1 | 10/2005 | Busse et al. | |
| 2008/0042597 A1 | 2/2008 | Hebborn | |
| 2012/0081016 A1 | 4/2012 | Wu et al. | |
| 2012/0206064 A1 * | 8/2012 | Archenhold | H05B 33/0812 |
| | | | 315/297 |
| 2013/0113381 A1 | 5/2013 | Cai et al. | |
| 2014/0292220 A1 * | 10/2014 | Trattler | H02M 3/157 |
| | | | 315/287 |
| 2015/0084527 A1 * | 3/2015 | Siu | H05B 33/0815 |
| | | | 315/186 |

FOREIGN PATENT DOCUMENTS

| | | |
|---|---|---|
| DE | 102004016944 A1 | 10/2005 |
| DE | 202012102882 U1 | 11/2012 |
| DE | 102012206976 A1 | 10/2013 |
| EP | 2315497 A1 | 4/2011 |
| WO | 2013160462 A1 | 10/2013 |

OTHER PUBLICATIONS

International Search Report based on application No. PCT/EP2015/054280 (5 pages + 3 pages English translation) dated Aug. 17, 2015.
Chinese Office Action based on application No. 201580016475.2 (7 pages + 5 pages English translation) dated May 31, 2017.

* cited by examiner

CIRCUIT ARRANGEMENT AND METHOD FOR OPERATING SEMICONDUCTOR LIGHT SOURCES

RELATED APPLICATIONS

The present application is a national stage entry according to 35 U.S.C. § 371 of PCT application No.: PCT/EP2015/054280 filed on Mar. 2, 2015, which claims priorities from German application Nos.: 10 2014 205 469.9 filed on Mar. 24, 2014, and 10 2014 218 422.3 filed on Sep. 15, 2014, and is incorporated herein by reference in its entirety.

TECHNICAL FIELD

Various embodiments relate to a circuit arrangement and a method for operating a load, having an input for inputting a mains input AC voltage, a power converter circuit, a converter circuit which converts the mains input AC voltage into an output voltage, a control circuit for controlling the converter circuit, and a linear regulating circuit which sets a predetermined load current at the load, the load current being a direct current.

BACKGROUND

Various circuit topologies for converters are known in order to generate a current suitable for semiconductor light sources, such as light-emitting diodes, from a mains AC voltage. The converters usually have a two-stage construction. A first stage operates as power factor correction in order to effect sinusoidal mains power consumption which is prescribed in many countries. This first stage generates a constant output voltage which is often referred to as an intermediate circuit voltage. This stage is often in the form of a boost converter. On the basis of this output voltage, the second stage generates a current which is suitable for the semiconductor light sources.

For this purpose, a buck converter is often used as the circuit topology. However, the choice of these converter topologies also results in disadvantages. The combination of two switching regulators is very complicated and expensive to produce. Therefore, many proposals were presented of how the circuit topology can be simplified and the production costs can be reduced. For example, EP 2 315 497 A1 proposed the practice of replacing the buck converter with a linear regulator. However, this is possible only if the semiconductor light sources to be operated have a sufficiently high voltage since the output voltage in the boost converter is very high owing to the system.

SUMMARY

Various embodiments provide a circuit arrangement for operating a load which can be produced in a simple and cost-effective manner and no longer has the above-mentioned disadvantages.

Various embodiments also provide a method for operating a load which can be carried out using the above circuit arrangement and makes it possible to use the existing resources more efficiently.

The circuit arrangement according to various embodiments for operating a load has:
an input for inputting a mains input AC voltage,
a power converter circuit,
a converter circuit which converts the mains input AC voltage rectified by the power converter circuit into an output voltage,
a control circuit for controlling the converter circuit,
a linear regulating circuit which sets a predetermined load current at the load,
the load current being a direct current, and
the control circuit controlling the converter circuit in such a manner that the current intensity of the load current is reduced when the output voltage is at a minimum. In this case, the minimum of the output voltage correlates to the minimum mains voltage.

This measure ensures that all components of the circuit arrangement according to various embodiments are used in an optimum manner, with the result that a maximum amount of power can be delivered to the load with little installation space and low costs. The design of the single-stage converter simultaneously enables power factor correction with an optimum operating mode of the load.

In this case, the load may consist of light-emitting diodes (LEDs). A plurality of LEDs are particularly preferably connected in series. However, constellations of strings connected in parallel or LEDs connected partially in parallel are also possible and unproblematic.

The converter circuit may be a SEPIC converter. This has the advantage that power factor correction of the consumed power and stepping-down or else stepping-up of the output voltage can be effected using one converter stage. It is therefore possible to achieve a very wide output voltage range. In the case of a SEPIC converter, the load can therefore consist of a few LEDs connected in series since the output voltage of the SEPIC converter can be stepped down.

In another embodiment, the converter circuit is a boost converter. This has the advantage of a more favorable circuit since fewer and more favorable components can be used. However, the load must consist here of a multiplicity of LEDs connected in series since the output voltage of the boost converter is very high.

The potential at a node between the load and the linear regulating circuit is preferably used to regulate the converter circuit. This ensures high efficiency of the circuit arrangement since the output voltage is regulated using this measure in such a manner that the load on the linear regulator is minimal.

One configuration is that a storage capacitor is coupled to the node in such a manner that it has its potential, the potential of the storage capacitor being input to the control circuit for the purpose of regulating the output voltage of the converter circuit. This measure means that the control circuit is always supplied with a measurement signal which has the correct potential but is decoupled. In this case, the storage capacitor is charged via a charging resistor and is discharged to the potential of the node via a discharge diode. This ensures the necessary decoupling with simultaneous potential simulation.

A storage capacitor may be particularly coupled to the node via a voltage divider in such a manner that it has a potential correlating to the node, the potential of the storage capacitor being input to the control circuit for the purpose of regulating the output voltage of the converter circuit. The voltage divider can be used to adapt the output voltage of the converter to which the control circuit regulates. In this case, it is possible to design the regulated system to be optimal. According to various embodiments, the regulating point is set in such a manner that the output voltage of the converter no longer suffices to maintain the predetermined load current when the output voltage is at a minimum. Therefore, the load current experiences modulation which can be set by selecting the circuit parameters, inter alia through the resistance values of the voltage divider, and tuning the linear regulator.

In one embodiment, the storage capacitor is charged via a charging resistor and is discharged to a potential defined by the voltage divider and the potential of the node via a discharge diode and the voltage divider. This again ensures the necessary decoupling with simultaneous potential simulation.

In another embodiment, the second resistor consists of a series circuit including a third resistor and a temperature-dependent resistor. With a suitable design, this measure makes it possible to achieve thermal derating in a simple, cost-effective and elegant manner, which, in the event of an excessively high temperature of the arrangement, reduces the output current through the LEDs in order to be able to protect the latter and the circuit arrangement.

In one embodiment, the temperature-dependent resistor is a PTC thermistor. The thermal derating can therefore be carried out in a particularly simple and cost-saving manner by connecting the PTC thermistor in series with the fixed resistor.

In another embodiment, a PTC thermistor is arranged in series with the discharge diode. Thermal derating can therefore be achieved in a simple manner, which, in the event of excessively high temperatures, completely switches off the current through the LEDs. As a result of the fact that only one component more has to be used, very cost-effective thermal derating can be achieved.

A resistor may be also arranged in parallel with the PTC thermistor. This means that a minimum current through the LEDs is retained even in the event of high temperatures.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
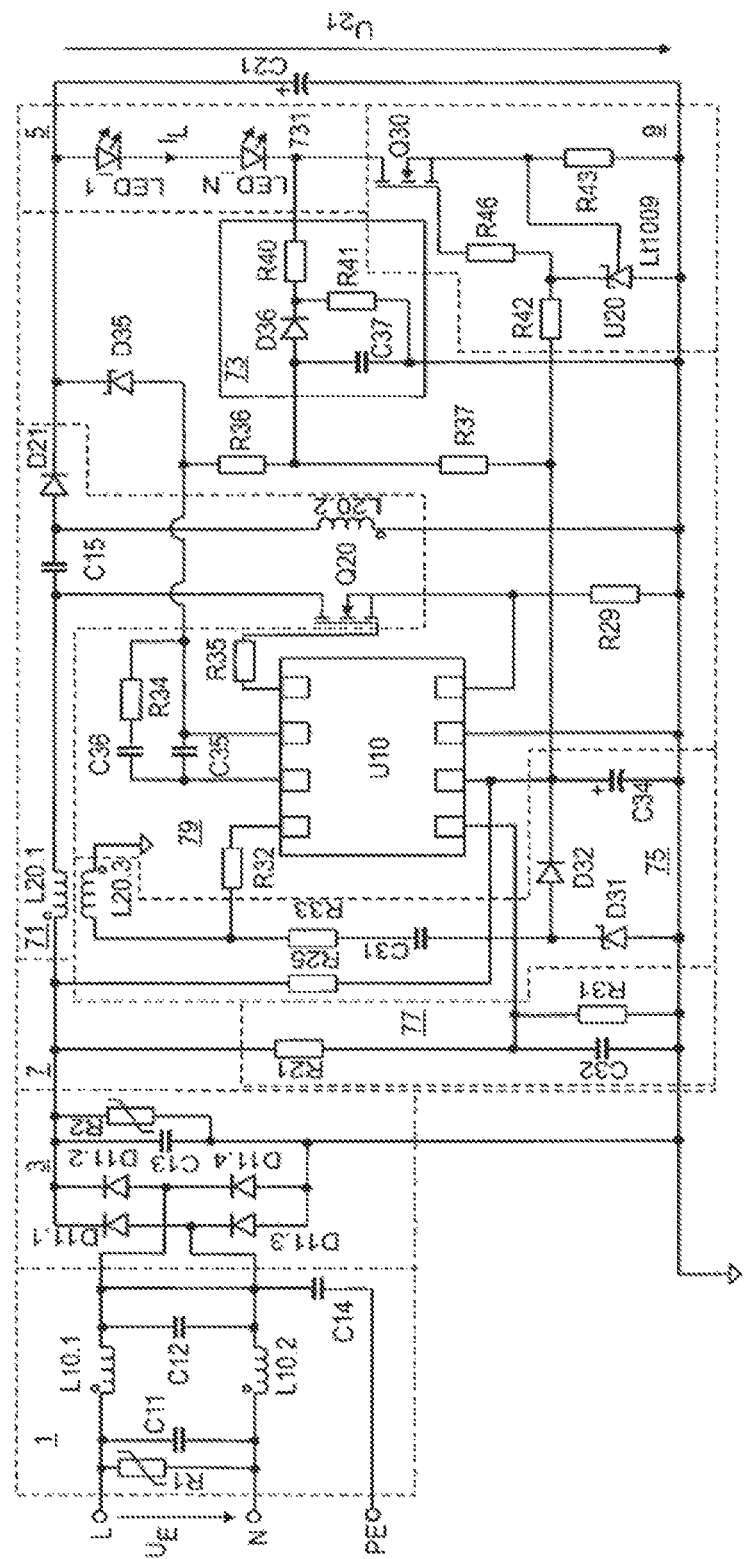
FIG. 1 shows the circuit diagram of a first embodiment of the circuit arrangement according to the present disclosure having a SEPIC converter as the converter stage and a linear regulator connected downstream of the latter.

FIG. 1 shows a preferred embodiment of the circuit arrangement according to the present disclosure. The circuit arrangement has an input section 1 which primarily ensures that the mains voltage which has been input is filtered. The input section also contains components which are used to protect the circuit arrangement. These may be varistors or TVS diodes, for example.

The input section 1 is connected to a power converter section 3 which converts the mains AC voltage into a DC voltage. The power converter section 3 preferably has a full-wave rectifier.

The power converter section 3 is adjoined by the converter stage 7. The converter stage 7 has a SEPIC converter (single ended primary inductance converter) 71. This is controlled by a control circuit 79. The required measured values are determined by means of measuring circuits 73, 77 and are supplied to the control circuit. An auxiliary voltage supply 75 supplies the control circuit with energy.

The converter stage 7 generates an output voltage $U_{21}$ which is input to a linear regulator 9. The linear regulator 9 uses the voltage $U_{21}$ to generate a current for the load 5 which preferably consists of a plurality of light-emitting diodes LED_1 . . . LED_N connected in series. It goes without saying that a plurality of strings of LEDs connected in series may also be connected in parallel. Mixed forms of series and parallel circuits are also possible.

The input section 1 preferably has a filter including a current-compensated inductor L10, the first connections of which are coupled to two inputs L, N. An interference suppression capacitor C11 is arranged between these inputs L, N. A further interference suppression capacitor C12 is arranged between the second connections of the current-compensated inductor L10.

A resistor R1 which may also be in the form of a varistor is arranged parallel to the interference suppression capacitor C11. Ground PE can be coupled via a Y capacitor C14 at the node between C12, R1 and that part of the current-compensated inductor which is coupled to the input N. However, this is not absolutely necessary.

The power converter section 3 has four diodes D11.1 to D11.4 which are connected in the form of a full-wave rectifier. A storage capacitor C13 is coupled to the output of the full-wave rectifier. A resistor R2 which may also be in the form of a varistor is arranged parallel to the storage capacitor C13.

The two poles of the storage capacitor C13 are coupled to the input of the converter stage 7. The converter stage 7 has a SEPIC converter 71. The latter has a first inductor L20.1, the first pole of which is coupled to a pole of the storage capacitor C13. The second pole of the inductor L20.1 is coupled to a first pole of a converter capacitor C15 and to the working electrode of a converter transistor Q20. The second pole of the converter capacitor C15 is coupled to the first pole of a second inductor L20.2 and to the anode of a converter diode D21. The first inductor L20.1 and the second inductor L20.2 are magnetically coupled to one another. DE 10 2004 016 944 A1 discloses the advantages of magnetically coupling the two inductors. The cathode of the converter diode D21 is identical to the output of the converter stage 7. The second pole of the second inductor L20.2 is coupled to the reference potential of the input section 1. The reference electrode of the converter transistor Q20 is coupled to a resistor R29, the other pole of which is coupled to the reference potential of the input section 1.

The control electrode of the converter transistor Q20 is coupled to an output of the control circuit 79.

The control circuit 79 has a first input which is coupled to a series circuit including two resistors R36 and R37. The coupling point of the two resistors is coupled to a first measuring circuit 73.

A second measuring circuit 77 consists of a further voltage divider including two resistors R21, R31 which are connected in series. The resistors are connected between the input connections of the converter stage 7. The node of these resistors is coupled to a second input of the control circuit 79. Another capacitor C32 is connected in parallel with the resistor R31.

The auxiliary voltage supply 75 has a series circuit including a starting resistor R25 and a storage capacitor C34. The starting resistor is coupled to the positive input connection of the converter stage 7. The storage capacitor is coupled to the negative input connection of the converter stage 7 which is identical to the reference potential of the circuit arrangement. The connection point between the starting resistor R25 and the storage capacitor C34 is the output of the auxiliary voltage supply 75 and supplies the control circuit 79, inter alia. The starting resistor R25 is used only to charge the capacitor C34 after connection to the mains voltage, with the result that the circuit can actually start. The circuit is supplied by a third inductor L20.3 which is magnetically coupled to the first inductor L20.1, with the result that it acts as a transformer. As soon as the SEPIC converter has started, an AC voltage is induced in the third inductor L20.3, which AC voltage is passed, via an optional non-reactive resistor R33 and a blocking capacitor C31, to a diode D32 which charges the storage capacitor C34 and maintains a reliable auxiliary voltage. The other connection of the third inductor L20.3 is coupled to the reference potential of the circuit arrangement. The voltage is set by a Zener diode D31, the anode of which is coupled to the reference potential of the circuit arrangement and the cathode of which is coupled to the connection point between the anode of the diode D32 and the blocking capacitor C31. The voltage at the storage capacitor C34 can be limited to a maximum value via this Zener diode. The voltage is preferably 15 V-20 V.

The output of the auxiliary voltage supply 75 is coupled to one end of the series circuit including the two resistors R36 and R37 already mentioned above, the other end of which series circuit is coupled to the first input of the control circuit 79.

The control circuit 79 has an integrated circuit U10 which regulates the SEPIC converter 71. The SEPIC converter 71 is preferably regulated in such a manner that a high mains power factor at the input is ensured. For this purpose, the mains voltage is measured with the aid of the second measuring circuit 77 and a corresponding measured value is input to the control circuit 79. However, this measure is not required in every integrated circuit; integrated circuits are also known which can derive the necessary information from the ripple of the output voltage. A second measuring circuit 77 is then not required for such integrated circuits. The control circuit 79 regulates the voltage of the SEPIC converter 71 to the voltage input to the first input via the resistor R36.

The load 5 preferably has a series circuit including a plurality of LEDs. As already mentioned above, the LEDs can also be partially or completely connected in parallel. The cathode of the first LED LED_1 is coupled to the output of the converter stage 7 and the cathode of the last LED LED_N is coupled to the output of the linear regulator 9.

The linear regulator 9 has a transistor Q30, the working electrode of which is coupled to the cathode of the last LED LED_N which therefore forms the output of the linear regulator 9. The reference electrode of the transistor Q30 is coupled to a shunt resistor R43. The other connection of the shunt resistor R43 is coupled to the reference potential of the circuit arrangement. The node between the reference electrode and the shunt resistor R43 is coupled to a voltage reference U20. The anode of the voltage reference U20 is coupled to the reference potential of the circuit arrangement. The cathode of the voltage reference is coupled to the node of two resistors R42 and R46 connected in series, one end of which is coupled to the control electrode of the transistor Q30 and the other end of which is coupled to the output of the auxiliary voltage supply 75. The resistor R42 is used to supply the voltage reference U20. The resistor R46 is used to decouple the control electrode of the transistor Q30 and is optional.

A storage capacitor C21 is coupled to the output of the converter stage 7 and to the reference potential. The output voltage U21 of the converter stage 7 is applied to the storage capacitor.

With respect to the method of operation:

According to the present disclosure, the SEPIC converter and the linear regulator cooperate in such a manner that the linear regulator can no longer compensate for the ripple voltage of the SEPIC converter when the output voltage U21 is at a minimum, thus resulting in current modulation in the load current through the load 5. The output voltage U21 has a relatively small ripple which stems from the sinusoidal oscillation of the mains voltage. The level of the current modulation can be set by designing the circuit arrangement according to the present disclosure.

The quotient of the difference between the maximum current and the minimum current and the sum of the maximum current and the minimum current is considered below as current modulation. In a formula, the modulation can therefore be defined as follows:

$$\text{Current modulation} = \frac{I_{max} - I_{min}}{I_{max} + I_{min}}$$

As a result of the fact that the circuit arrangement must no longer be able to provide the full current when the output voltage $U_{21}$ is at a minimum, the components of the circuit arrangement can be used in a considerably better manner and can be dimensioned to be considerably smaller. This saves installation space and costs. The installation space can be considerably reduced depending on the current modulation.

In the circuit arrangements known from the prior art, the converter is usually regulated to a constant output voltage. Applied to the present case, a known converter would be regulated in such a manner that the output voltage $U_{21}$ of the converter stage 7 remains constant.

According to the present disclosure, the SEPIC converter is not regulated to a constant output voltage, but rather to a voltage which is generated by the measuring circuit 73. The measuring circuit 73 has a first input which is coupled to the potential of the node 731 between the working electrode of the transistor Q30 and the cathode of the last LED LED_N. The voltage at this node fluctuates on account of the voltage ripple of the SEPIC converter 71. The circuit arrangement according to the present disclosure is deliberately designed in such a manner that a significant voltage ripple occurs at the output of the SEPIC converter 71 since the capacitance value of the storage capacitor C21 is comparatively small. This measure saves costs and installation space. The linear regulator 9 again compensates for these voltage fluctuations, with the result that the LEDs are operated with a uniform load current and have uniform light output. As a result, however, the potential at the point 731 has approximately the same voltage ripple as the potential at the output of the SEPIC converter 71.

The measuring circuit 73 has a capacitor C37, with which a series circuit including a diode D36 and a resistor R41 is connected in parallel. The node between the cathode of the diode D36 and the resistor R41 is coupled to a resistor R40, the other end of which is in turn coupled to the first input of the measuring circuit 73. The node between the anode of the diode D36 and the capacitor C37 forms the output of the measuring circuit 73. The output of the measuring circuit 73 is coupled to the node of the two resistors R36 and R37. Since the resistor R37 is in turn coupled to the output of the auxiliary voltage supply 75, the capacitor C37 is charged to the voltage of the auxiliary voltage supply 75. However, this functions only as long as the potential at the point 731 is greater than the potential of the capacitor C37 since the diode D36 then decouples the potentials. However, if the potential at the point 731 is smaller than the potential at the capacitor C37, a current can flow into the point 731 via the diode D36. The capacitor C37 is therefore charged by the auxiliary voltage supply 75 and is discharged to the voltage at the point 731 via the diode D36 and the resistor R40. In this case, the two resistors R40 and R41 connected in series form a voltage divider which can be used to adapt the potential of the capacitor C37 in comparison with the point 731. As a result of the fact that the resistor R40 has a smaller resistance value than the resistor R37, the voltage at the capacitor C37 is tracked to the voltage at the point 731 taking into account the voltage divider. The voltage of the capacitor C37 which is applied to the output of the measuring circuit 75 is input to the first input of the control circuit 79 via the resistor R36.

The control circuit 79 therefore always "sees", at its input, a voltage which corresponds to the minimum voltage divided by the voltage divider R40/R41 at the point 731. In principle, the voltage can thereby be regulated in such a manner that it corresponds to the summation voltage of the maximum forward voltage of the LEDs together with the voltage across the transistor Q30 and the voltage at the shunt resistor R43. As a result, the linear regulator must substantially compensate only for the voltage ripple of the SEPIC converter 71, thus minimizing the power loss.

In addition, a Zener diode D35 which also additionally limits the output voltage U21 of the converter is also connected between the output of the converter, that is to say at the cathode of the diode D21, and the input of the control circuit 79. In this case, the cathode of the Zener diode D35 is coupled to the cathode of the diode D21. The anode of the Zener diode D35 is coupled to the input of the control circuit 79. In the case of an excessively high output voltage, the Zener diode turns on and adds a signal to the signal from the measuring circuit 75. In this case, the signal from the Zener diode D35 has a stronger effect than the signal from the measuring circuit 73. In the case of an excessively high voltage, for example because too many LEDs are connected to the output, the circuit is actively protected since the output voltage is limited to a value predefined by the value of the Zener diode D35.

In this case, the temperature behavior of the Zener diode D35 can be additionally used by virtue of the smaller voltage of the Zener diode D35 resulting in a lower output voltage and therefore a lower output current in the case of cold temperatures and thus actively protecting the storage capacitor C21 which has a higher impedance at low temperatures.

The linear regulator 9 is dimensioned in such a manner that the predefined current always flows through the LEDs connected in series. The path between the working electrode and the reference electrode of the transistor Q30 therefore compensates for the voltage ripple, with the result that a direct current of a predefined intensity always flows through the LEDs. The current is measured via the shunt resistor R43, and the reference voltage source U20 and the resistors R42/R46 output a control signal to the control electrode, thus producing a regulated system. The current intensity to which the linear regulator regulates can be set by dimensioning the shunt resistor R43 and by means of the reference voltage source U20.

According to the present disclosure, the voltage divider R40/R41 is now dimensioned in such a manner that the SEPIC converter regulates the voltage at its output in such a manner that it is smaller than the summation voltage of the forward voltage of the LEDs together with the voltage across the transistor Q30 and the voltage at the shunt resistor R43. The voltage at the shunt resistor R43 results from the voltage from the reference voltage source U20. The losses in the shunt resistor R43 can be reduced by suitably selecting a reference voltage source U20 with a smaller reference voltage. As a result of the fact that the summation voltage is greater than the voltage at the output of the SEPIC converter 71, the linear regulator 9 is no longer able to maintain the current intensity when the output voltage U21 is at a minimum, and the current through the LEDs is therefore no longer a uniform current but rather decreases somewhat when the output voltage U21 is at a minimum. This decrease is also referred to as the depletion mode below. Current modulation in the load current through the LEDs is therefore produced. The level of the current modulation can be set by dimensioning the resistors R40/R41.

As a result of this measure, the components of the circuit arrangement are used in an optimum manner and the circuit arrangement can deliver a higher current or a higher power to the LEDs than the circuits known from the prior art when the components are dimensioned in an identical manner.

Figure 2:
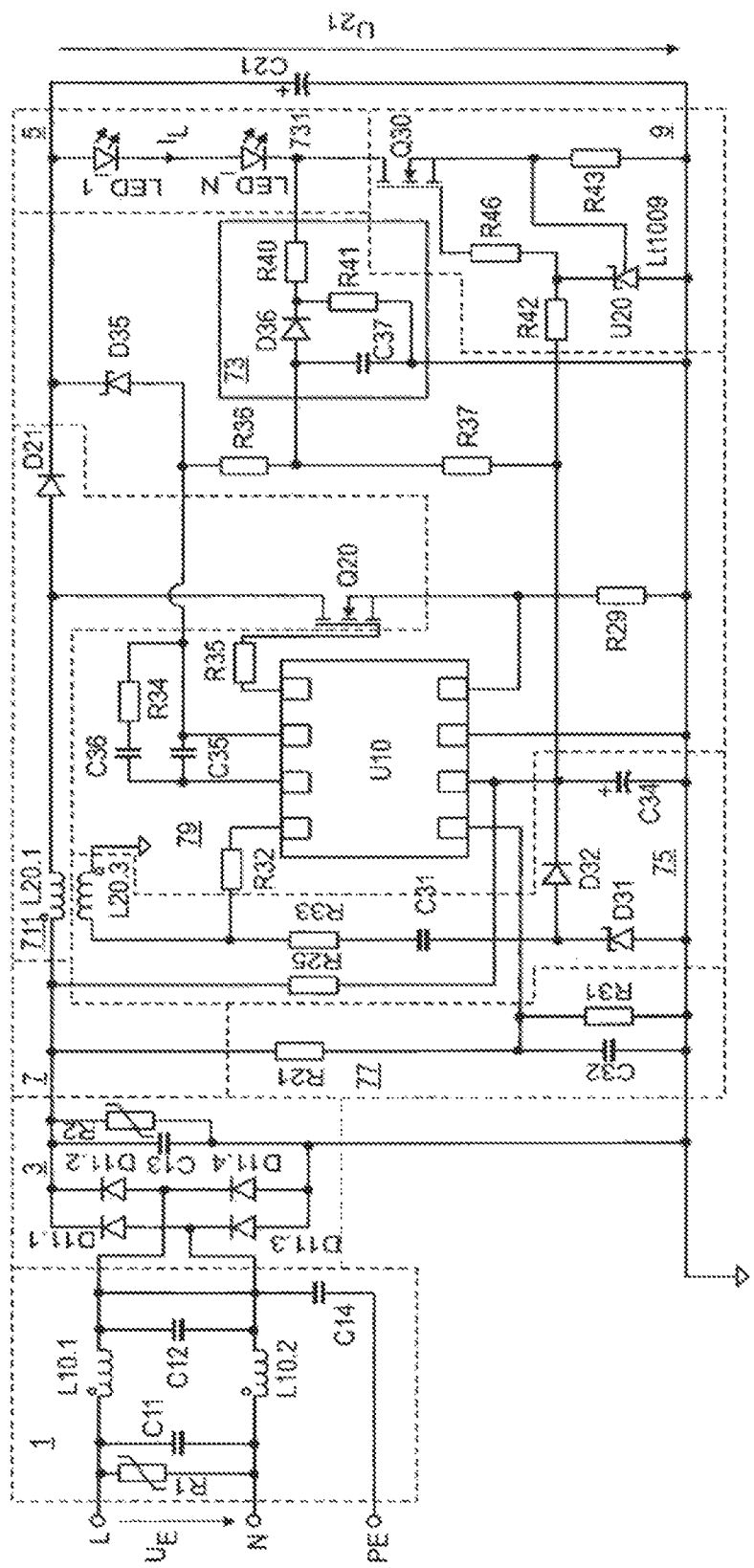
FIG. 2 shows the circuit diagram of a second embodiment of the circuit arrangement according to the present disclosure having a boost converter as the converter stage and a linear regulator connected downstream of the latter.

FIG. 2 shows the circuit diagram of a second embodiment of the circuit arrangement according to the present disclosure having a boost converter as the input stage and a linear regulator connected downstream of the converter as the output stage. The second embodiment is similar to the first embodiment and only the differences from the first embodiment are therefore described. Instead of the SEPIC converter 71, the second embodiment has a boost converter 711. The circuit arrangement is therefore identical apart from the two components missing for a SEPIC converter. These two components are the converter capacitor C15 and the second inductor L20.2. A boost converter does not require these components and they are therefore missing in the second embodiment.

In comparison with the SEPIC converter 71, the boost converter 711 has the disadvantage that the output voltage of the converter must always be higher than the maximum mains voltage. This results in many LEDs connected in series being required as the load in order to be able to implement the method of operation according to the present disclosure. The forward voltage of the LEDs may indeed be only slightly lower than the minimum output voltage U21 of the converter. The minimum output voltage U21 of a boost converter is approximately 360 V for a mains input voltage of 230 V. For an average forward voltage of an LED of approximately 3 V, at least 120 LEDs connected in series are therefore required. Parallel strings can naturally also be concomitantly operated here again in order to further increase the number of LEDs. If the number of LEDs connected in series in the LED chain LED_1 to LED_N is large enough, the circuit arrangement can be operated in the manner according to the present disclosure.

Figure 3:
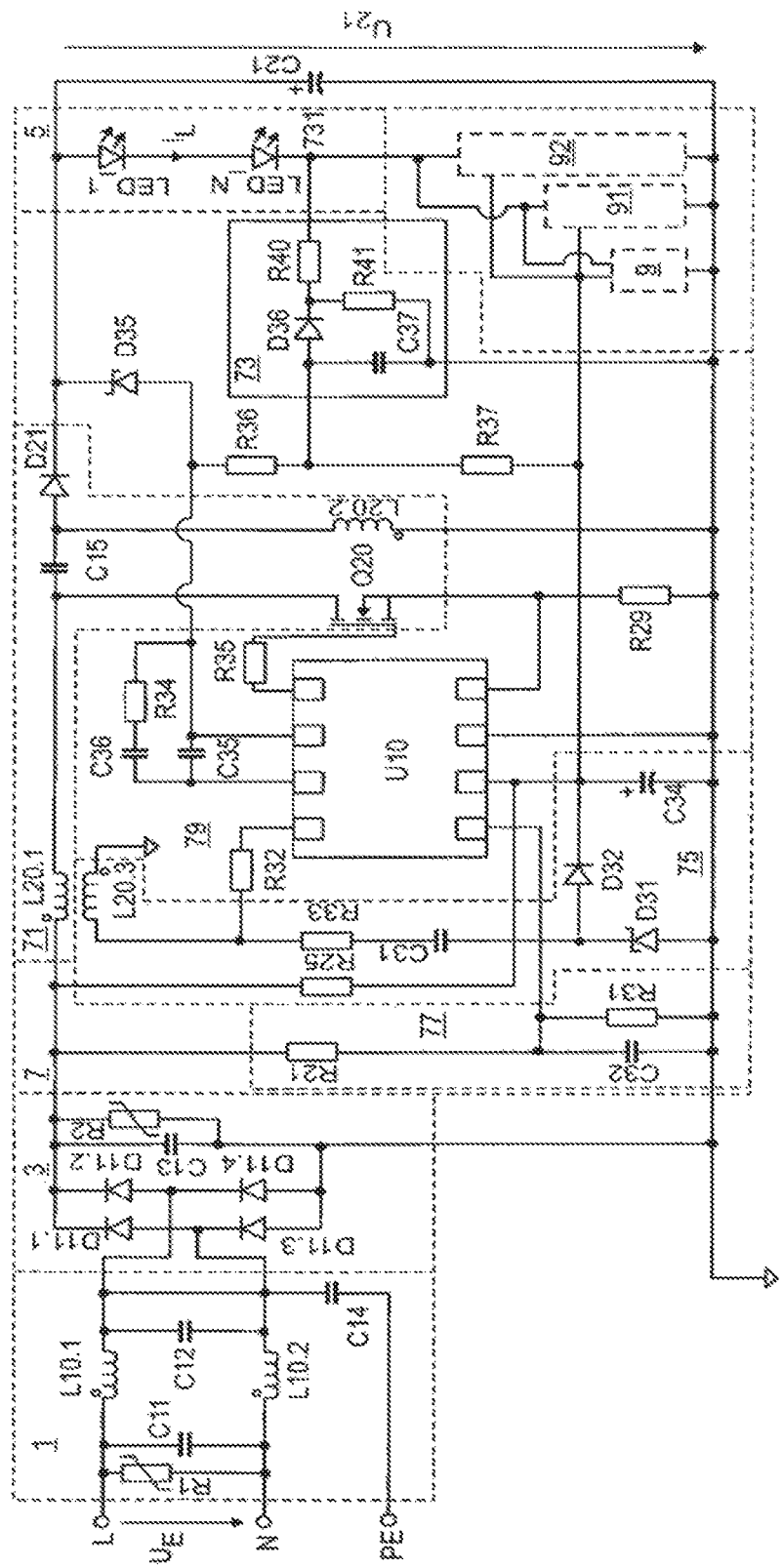
FIG. 3 shows the circuit diagram of a third embodiment of the circuit arrangement according to the present disclosure having a SEPIC converter as the converter stage and a plurality of linear regulators connected in parallel downstream of the latter.

FIG. 3 shows the circuit diagram of a third embodiment of the circuit arrangement according to the present disclosure having a SEPIC converter as the converter stage and a plurality of linear regulators connected in parallel downstream of said converter. The third embodiment is similar to the first embodiment and only the differences from the first embodiment are therefore described. In addition to the linear regulator 9, yet further linear regulators 91 and 92 are connected in parallel in the third embodiment, with the result that the total current is divided among these linear regulators. Variations in the component tolerances may result in the current not being divided in exactly identical parts. In this case, the linear regulator which sets the greatest voltage is then the "master" as it were and is followed by the other linear regulators.

Figure 4:
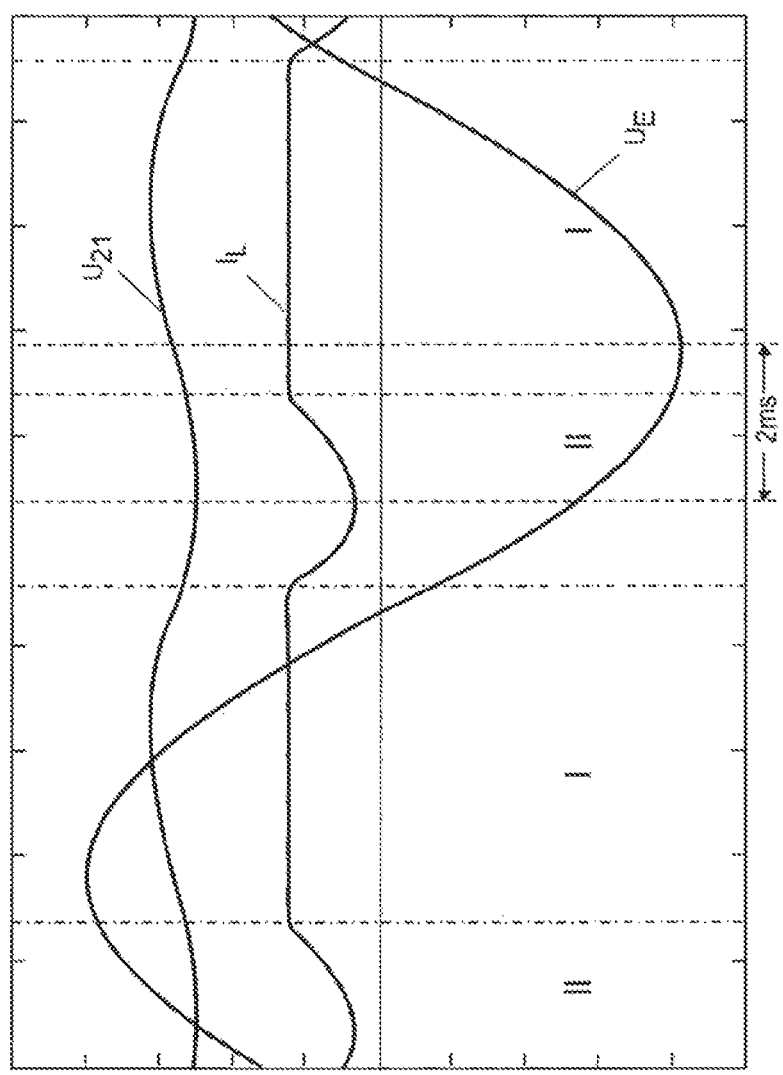
FIG. 4 shows an exemplary current form for the depletion mode according to the present disclosure with a modulation depth of approximately 9.5%.

FIG. 4 shows an exemplary current form IL for the depletion mode according to the present disclosure with a modulation depth of approximately 9.5%. It can be clearly seen in the figure that the current IL which is otherwise uniform falls when the output voltage U21 is at a minimum since the output voltage of the converter 71 then no longer suffices to maintain the predetermined current through the load. This region is marked with the Roman numeral II and is delimited by dash-dotted lines. In contrast, the Roman numeral I marks the region in which the output current IL reaches its nominal value. In this case, the current is uniform in this region, that is to say it always has the same current level when seen in terms of time. The minimum output voltage U21 results from the minimum mains voltage since the regulating characteristic of the converter is too slow. There is a phase shift of approximately 2 ms between the minimum output voltage U21 and the minimum mains voltage, which are both marked by dashed lines. However, the current modulation results from the minimum output voltage $U_{21}$ and not directly from the minimum mains input voltage $U_E$.

Figure 5:
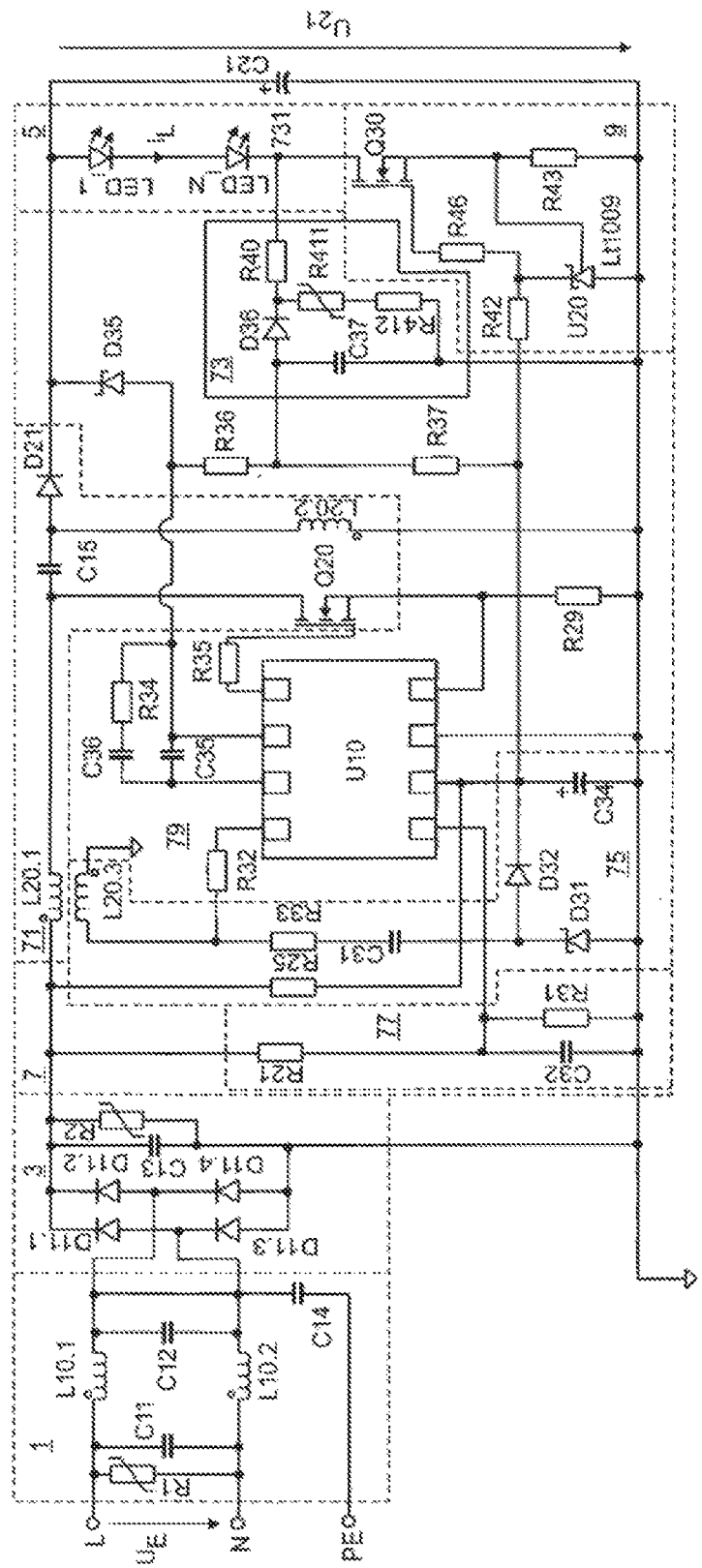
FIG. 5 shows the circuit diagram of a third embodiment of the circuit arrangement according to the present disclosure having a SEPIC converter as the converter stage and thermal derating which intervenes in the depletion mode.

FIG. 5 shows the circuit diagram of a third embodiment of the circuit arrangement according to the present disclosure having a SEPIC converter as the converter stage and thermal derating which advantageously intervenes in the depletion mode. The third embodiment is similar to the first embodiment and only the differences from the first embodiment are therefore described. The advantageous thermal derating is integrated in the first measuring circuit 73. In this case, the resistor R41 of the voltage divider including R40/R41 is advantageously divided into two resistors which are connected in series: a fixed resistor R412 and a PTC thermistor (PTC) R411. As already described above, the control circuit 79 always "sees", at its input, a voltage which corresponds to the minimum voltage divided by the voltage divider R40/R41 at the point 731. As a result of the fact that the resistor R41 is replaced with the series circuit including the resistors R411 and R412, in which case the resistor R411 is a PTC thermistor, thermal derating can be achieved in a simple and elegant manner. If the temperature increases, the resistance of the PTC thermistor R411 increases. This results in the ratio of the voltage divider shifting in such a manner that the potential at the cathode of the diode D36 increases. Since this potential is the cause of the current regulation, the control circuit 79 is led to believe there is a higher current than actually flows with increasing temperature.

The control circuit 79 therefore reduces the output voltage U21, which results in a lower current through the LEDs LED_1 . . . LED_N. Depending on the design, this measure may result in the current being reduced considerably, to 0 in the limiting case, in the case of high temperatures.

In the case of very unfavorable designs, the situation may occur in which an increase in the former resistor R41 by means of the PTC thermistor R411 does not have a sufficient effect to protect the circuit. This is the case when the resistance value of the resistor R41 is large in comparison with the resistor R40. An increase in the resistance of the resistor R41 then has only a minimal effect on the potential at the cathode of the diode D36. In this case, the transistor Q30 can be selected in such a manner that its bulk resistance ($RDS_{On}$) is greater. The useful signal from the linear regulator 9 therefore increases, as a result of which a more favorable voltage divider ratio of the voltage divider including the resistors R40 and R41 (where the resistor R41 corresponds to the series circuit including R411 and R412) can be selected.

Figure 6:
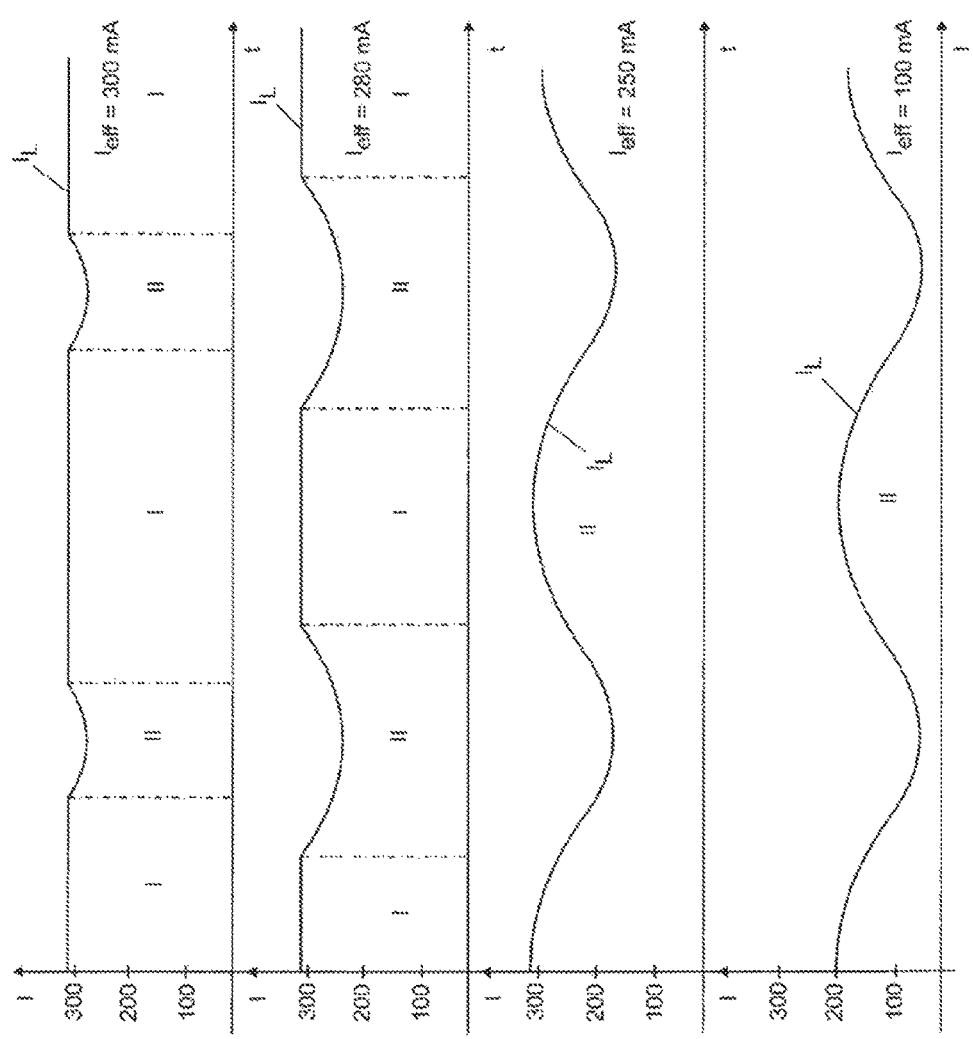
FIG. 6 shows exemplary current forms for the depletion mode according to the present disclosure during thermal derating at different temperatures.

FIG. 6 shows a few exemplary current forms of the output current IL for the depletion mode according to the present disclosure in the case of thermal derating according to FIG. 5 at different temperatures. In this case, like in FIG. 4, a distinction is made between a derating region II and a region I with a nominal output current.

The uppermost curve in FIG. 6 shows the depletion mode for an unproblematic temperature, that is to say the thermal derating does not yet intervene here. At this temperature, the PTC thermistor R411 still has a resistance which is small in comparison with the resistor R412. The total resistance of the series circuit is therefore determined by the fixed resistor R412. The resistance value of the fixed resistor R412 can be 30 kOhm, for example, whereas the nominal value of the PTC thermistor is 470 ohms. The root mean square value of the output current is 300 mA here, for example.

The second curve from the top shows the output current IL at a slightly increased temperature. It can be clearly seen that the modulation depth of the output current IL has increased and the current in the derating region II decreases more strongly than in the first curve. The root mean square value of the output current is 280 mA here, for example.

The third curve from the top shows the output current IL at a more greatly increased temperature. It can be clearly seen that the region I with the nominal output current is no longer reached and the current reflects the ripple voltage of the output voltage U21. The root mean square value of the output current is 250 mA here, for example.

The lowermost curve shows the output current IL at a very greatly increased temperature. It can be clearly seen that the output current has a considerably smaller DC component. Otherwise, it exhibits the same ripple as in the previous curve. As already mentioned, the ripple in the current stems from the output voltage U21. The root mean square value of the output current is 100 mA here, for example.

Figure 7:
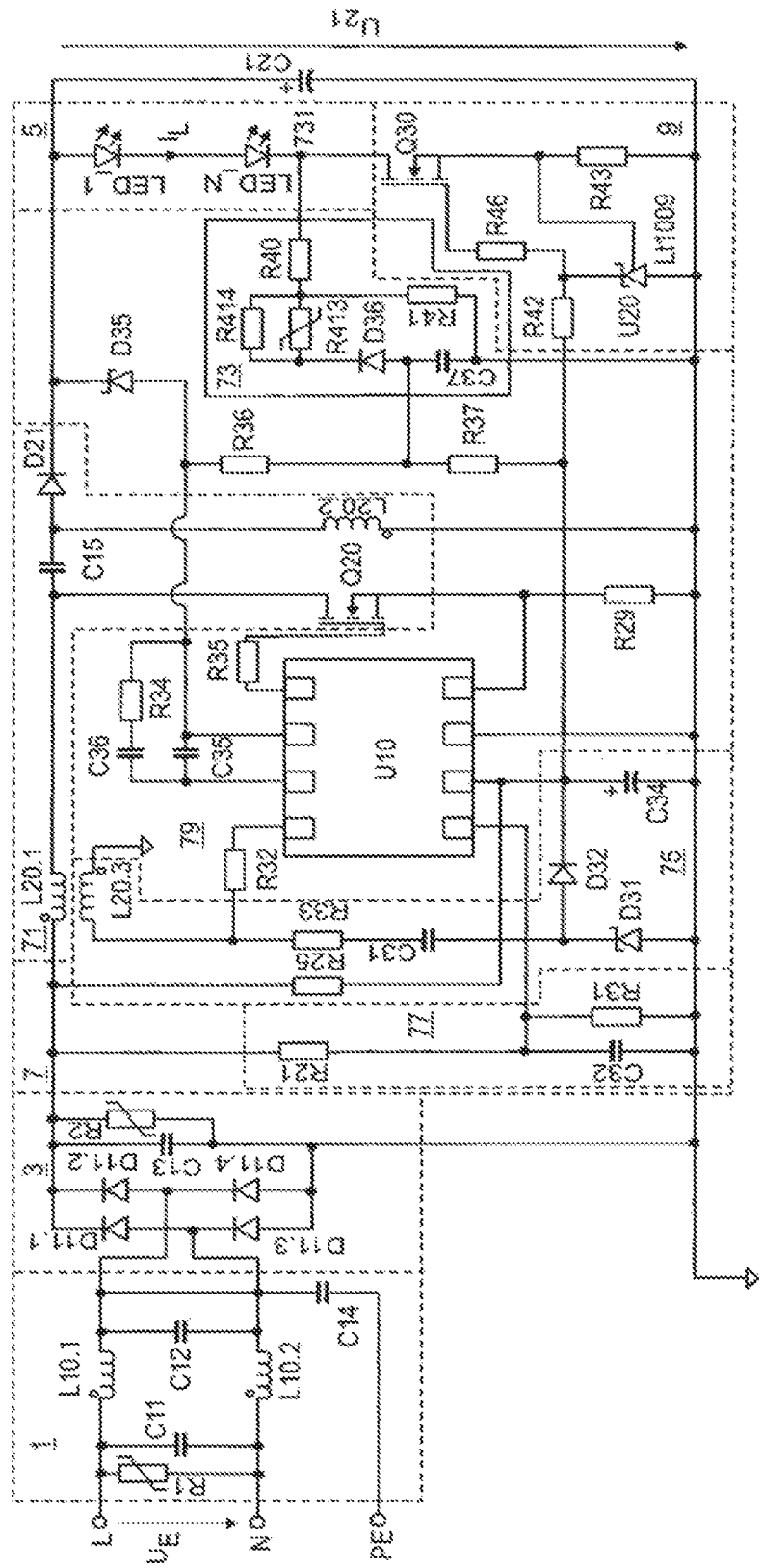
FIG. 7 shows the circuit diagram of a fourth embodiment of the circuit arrangement according to the present disclosure having a SEPIC converter as the converter stage and thermal derating which intervenes in the depletion mode.

FIG. 7 shows the circuit diagram of a fourth embodiment of the circuit arrangement according to the present disclosure having a SEPIC converter as the converter stage and thermal derating which intervenes in the depletion mode. The fourth embodiment is similar to the first embodiment and only the differences from the first embodiment are therefore described. The fourth embodiment has a PTC thermistor (PTC) in the discharge current path of the capacitor C37. Like in the first embodiment, the capacitor C37 is therefore charged here by the auxiliary voltage supply 75 but is discharged to the voltage at the point 731 via the diode D36, the PTC thermistor R413 and the resistor R40. In this embodiment, another resistor R414 is connected in parallel with the PTC thermistor R413. The two resistors R40 and R41 connected in series form a voltage divider which can be used to adapt the potential of the capacitor C37 in comparison with the point 731. As long as the circuit arrangement is cold, the PTC thermistor has a small resistance value. As a result of the fact that the series circuit including the resistor R40 and the PTC thermistor R413 has a smaller resistance value than the resistor R37, the voltage at the capacitor C37 is tracked to the voltage at the point 731 taking into account the voltage divider. The very high resistance value of the resistor R414 does not change the above consideration. In the fourth embodiment, the PTC thermistor R413 has a resistance value of 470 ohms, for example, whereas the resistor R414 connected in parallel has a resistance value of 10 kiloohms. In the cold state, the resistance value of the PTC thermistor R413 is much smaller than the value of the resistor R40 and is therefore not decisive for the discharge current of the capacitor C37.

However, if the PTC thermistor R413 becomes hot, its resistance value becomes much greater than the value of R40, with the result that it is the decisive component for the discharge current of C37. In this case, the resistance value of R413 becomes so large that the capacitor C37 is practically no longer discharged at all. A permanently high voltage is therefore established at C37 and the current through the LEDs 5 is regulated virtually to zero. So that this does not happen, the resistor R414 is connected in parallel with the PTC thermistor R413. This weakens the derating curve, with the result that a minimum current can nevertheless still flow through the LEDs 5 in the case of a hot circuit. The minimum current through the LEDs 5 can be set by dimensioning the resistor R414. If this is not required, the resistor R414 can also be omitted.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A circuit arrangement for operating a load, comprising:
an input for inputting a mains input AC voltage,
a power converter circuit,
a converter circuit which converts the mains input AC voltage rectified by the power converter circuit into an output voltage,
a control circuit for controlling the converter circuit, and
a linear regulating circuit which sets a predetermined load current at the load,
the load current being a direct current with a uniform current intensity,
wherein the output voltage is regulated such that a voltage in a ripple minimum is not enough to drive the load with the load current; and
wherein the control circuit controls the converter circuit in such a manner that the current intensity of the load current is reduced when the output voltage is at a minimum.

2. The circuit arrangement as claimed in claim 1, wherein the load consists of light-emitting diodes.

3. The circuit arrangement as claimed in claim 1, wherein the converter circuit is a SEPIC converter.

4. The circuit arrangement as claimed in claim 1, wherein the converter circuit is a boost converter.

5. The circuit arrangement as claimed in claim 1, wherein the potential at a node between the load and the linear regulating circuit is used to regulate the converter circuit.

6. The circuit arrangement as claimed in claim 5, wherein a storage capacitor is coupled to the node in such a manner that it has its potential, the potential of the storage capacitor being input to the control circuit for the purpose of regulating the output voltage of the converter circuit.

7. The circuit arrangement as claimed in claim 6, wherein the storage capacitor is charged via a charging resistor and is discharged to the potential of the node via a discharge diode.

8. The circuit arrangement as claimed in claim 5, wherein a storage capacitor is coupled to the node via a voltage divider comprising a first resistor and a second resistor in such a manner that it has a potential correlating to the node, the potential of the storage capacitor being input to the control circuit for the purpose of regulating the output voltage of the converter circuit.

9. The circuit arrangement as claimed in claim 8, wherein the storage capacitor is charged via a charging resistor and is discharged to a potential defined by the voltage divider and the potential of the node via a discharge diode and the first resistor.

10. The circuit arrangement as claimed in claim 9, wherein a PTC thermistor is arranged in series with the discharge diode.

11. The circuit arrangement as claimed in claim 10, wherein a resistor is arranged in parallel with the PTC thermistor.

12. The circuit arrangement as claimed in claim 8, wherein the second resistor consists of a series circuit comprising a third resistor and a temperature-dependent resistor.

13. The circuit arrangement as claimed in claim 12, wherein the temperature-dependent resistor is a PTC thermistor.

14. The circuit arrangement as claimed in claim 1, wherein a Zener diode is connected between the output of the converter circuit and the control circuit for the purpose of limiting the output voltage of the converter circuit.

15. A method for operating a load using a circuit arrangement to which a mains input AC voltage is input and which converts the latter into an output voltage, the circuit arrangement having a current limiting circuit which converts the output voltage into a load current for operating the load, characterized in that the circuit arrangement is operated in such a manner that the current intensity of the load current is reduced when the output voltage is at a minimum; and
regulating the output voltage such that a voltage in a ripple minimum is not enough to drive the load with the load current.

* * * * *